United States Patent [19]
Kaneda et al.

[11] Patent Number: 5,349,603
[45] Date of Patent: Sep. 20, 1994

[54] SOLID-STATE LASER RESONATOR

[75] Inventors: Yushi Kaneda; Michio Oka, both of Kanagawa, Japan

[73] Assignee: Sony Corporation, Japan

[21] Appl. No.: 976,276

[22] Filed: Nov. 13, 1992

[30] Foreign Application Priority Data

Nov. 25, 1991 [JP] Japan .................. 3-309103

[51] Int. Cl.⁵ .................. H01S 3/08; H01S 3/16; H01S 3/139
[52] U.S. Cl. .................. 372/101; 372/99; 372/33; 372/71
[58] Field of Search .................. 372/99, 101, 33, 71, 372/95

[56] References Cited

U.S. PATENT DOCUMENTS

| | | | |
|---|---|---|---|
| 4,910,740 | 3/1990 | Oka | 372/22 |
| 4,933,947 | 6/1990 | Anthon et al. | 372/34 |
| 5,001,718 | 3/1991 | Burrows et al. | 372/101 |
| 5,022,043 | 6/1991 | Jacobs | 372/95 |
| 5,048,047 | 9/1991 | Kozlovsky et al. | 372/99 |
| 5,197,073 | 3/1993 | Oka | 372/22 |
| 5,202,893 | 4/1993 | Kubota et al. | 372/101 |

Primary Examiner—Rodney B. Bovernick
Assistant Examiner—Robert McNutt
Attorney, Agent, or Firm—Limbach & Limbach

[57] ABSTRACT

A solid-state laser resonator includes a pair of reflectors 4, 5, a bar-like laser medium 6, a plurality of point laser sources 1, 2 and resonator including a plurality of resonator portions. At least one of the paired reflectors 4, 5 has a curved-surface mirror. The laser medium 6 is interposed between the paired reflectors 4, 5. Laser beams 8 emitted from the point laser sources 1, 2 are passed through one of the paired reflectors 4, 5 and irradiated as pumping lights on one end face of the laser medium 6. The resonators include the pair of reflectors, the laser sources 1, 2 and a plurality of thermal lenses. The thermal lenses are formed within the laser medium 6. The resonators produce output laser beam to produce from the other end face of the laser medium 6 through other one of the reflector 5.

8 Claims, 6 Drawing Sheets

SOLID-STATE LASER RESONATOR

BACKGROUND

1. Field of the Invention

The present invention relates to lasers. More particularly, the present invention is related to a solid-state laser resonator having a pair of reflectors and a bar-like laser medium interposed between the pair of reflectors.

2. Background of the Invention

A conventional example will be first described with reference to FIG. 1. There is shown a cylindrical solid-state laser medium 6, for example Nd:YAG. In addition, a pair of flat mirrors 4F and 5F are provided at opposite ends of the laser medium 6 so that the surfaces of the mirrors are opposed to each other.

A plurality of laser diodes 1 are also shown. In this example, four such diodes 1 are used. Each of the laser diodes 1 emits a laser beam having a wavelength of, for example, 0.81 $\mu$m. The laser beam from the laser diodes 1 are individually incident to the end faces of a set of optical fibers 2. The other set of end faces 2T of these four optical fibers 2 are fixed in place in an overcoating 2B locating them at the four vertexes of, for example, a 400-$\mu$m square as illustrated. The four laser beams are divergently excited from the other end faces of the four optical fibers 2 which are fixed at the vertexes of the square. Then, the laser beams exiting the end faces 2T are incident to coupling lens 3, which is like a convex lens, of which the magnifying power is, for example, 2. The four laser beams exit from the lens 3 as pumping laser beams 8 and are incident to the back of the flat mirror 4F.

The flat mirror 4F has a transparent base material coated with a mirror coating layer. The mirror coating layer is deposited on the inner side of the transparent base material so that 100% of the above mentioned pumping laser beams 8 are transmitted therethrough and 100% of the incident laser beam, which for example has a wavelength of 1.06 $\mu$m, is reflected. The other mirror 5F also has a transparent base material and a mirror coating layer. The mirror coating layer is formed on the inner side of the transparent base material so that it reflects, for example, 95% of incident 1.06 $\mu$m laser beam. The remaining 5% is transmitted through the mirror 5F as an output beam.

Therefore, the four pumping laser beams 8 which are incident to the back of the flat mirror 4F arrive at the end face of the laser medium 6 and are focused within the laser medium 6. The laser beams thus heat four excited regions 7 within the laser medium 6, so that thermal lenses, which are convex lenses, are formed therein. This results in creating four resonator portions which are formed of a pair of flat mirrors 4F, 5F, the laser medium 6 therebetween and the four thermal lenses within the laser medium. Thus, a pair of flat mirrors 4F, 5F has four pairs of flat mirror portions for the four resonator portions. Referring to FIG. 2, the points of X=1 mm, Y=1 mm is represented by A1, the point of X=−1 mm, Y=−1 mm by A2, the point X=0 mm, Y=1 mm by B1, and the point of X=1 mm, Y=0 mm by B2. FIG. 3 shows the temperature distributions on the cross-sections O-A1 and B1-B2. From the graph of temperature distributions, note that the temperature distribution on the cross-section B1-B2 is symmetrical with respect to the straight line passing through the center (X=0.5 mm, Y=0.5 mm) of the excited region 7. Also note that the temperature distribution on the cross-section O-A1 is asymmetrical therewith. In addition, the optical axis of the thermal lens is deviated from the axis of the excited region 7 of the laser medium.

Therefore, the conventional solid-state laser resonator is reduced in its oscillation efficiency by an amount corresponding to the deviation of the optical axes of the thermal lenses formed within the laser medium 6, or by the amount that the excited regions and the oscillation regions are separated. Also, the asymmetric property of each of the four excited regions 7 of the laser medium causes an aberration in the output laser beam.

SUMMARY OF THE INVENTION

It is, therefore, an object of the present invention to provide a solid-state laser resonator with improved oscillation efficiency and reduced aberration of the output laser beam.

According to this invention, there is provided a solid-state laser resonator having a pair of reflectors, one of which has a convex surface, a laser medium, and thermal lenses which are prevented from optically interfering with each other by previously selecting a proper value for the relative distance between the four spots of the beams incident on the end of the laser medium 6.

Thus, four fundamental-mode oscillation laser beams with the natural wavelength of 1.06 $\mu$m are generated within the laser medium 6 and repeatedly reflected from the pair of the flat mirrors 4F, 5F so as to be transmitted forward and backward between the pair of flat mirrors 4F, 5F. A part of the oscillating laser beams is transmitted through the flat mirror 5F as an output laser beam 9.

According to this solid-state laser beam resonator, the oscillating laser beams in the four resonator portions can be synchronized with each other by selecting proper values for the intensity of the pumping laser beams and the distance between the pumping laser beams incident to the laser medium.

A second of the problems with this conventional solid-state laser resonator will be described below. FIG. 2 shows isothermal lines of a distribution obtained by simulation, which may be also considered as a distribution of a refractive index within the laser medium 6, in a cross-section perpendicular to the axis of the resonator shown in FIG. 1. If orthogonal coordinates X and Y are used on the cross-section with the origin O provided at the center, the centers of the four regions excited by the laser beams of 0.2 mm in a diameter are located at the points of X=±0.5 mm and Y=±0.5 mm on the cross-section on which the temperature distribution is shown by isothermal lines. In FIG. 2, there is a plurality of point laser sources and resonators. Laser beams emitted from the laser sources are passed through one of the pair of the reflectors and irradiated as pumping lights on one end face of the laser medium. The resonator has a plurality of the resonator portions. The resonator portions include the pair of reflectors, the laser medium and a plurality of thermal lenses. The thermal lenses are formed within the laser medium. The resonator causes an output laser beam to be produced from the other end face of the laser medium through the other one of the reflectors.

According to this invention, since the thermal lenses formed in the laser medium to which a plurality of pumping laser beams are incident have such refractive index distribution that the isorefractive-index lines are concentric around each of the incident points of pumping laser beams, a plurality of excited regions of the laser medium coincide with the oscillation regions, and thus the oscillation efficiency is improved. In addition, since the output laser beam has no distortion in its waveform front the aberration of the output laser beam is decreased.

BRIEF DESCRIPTION OF THE DRAWING

The invention will be more readily understood with reference to the accompanying drawing, wherein.

DESCRIPTION OF THE INVENTION

Figure 1:
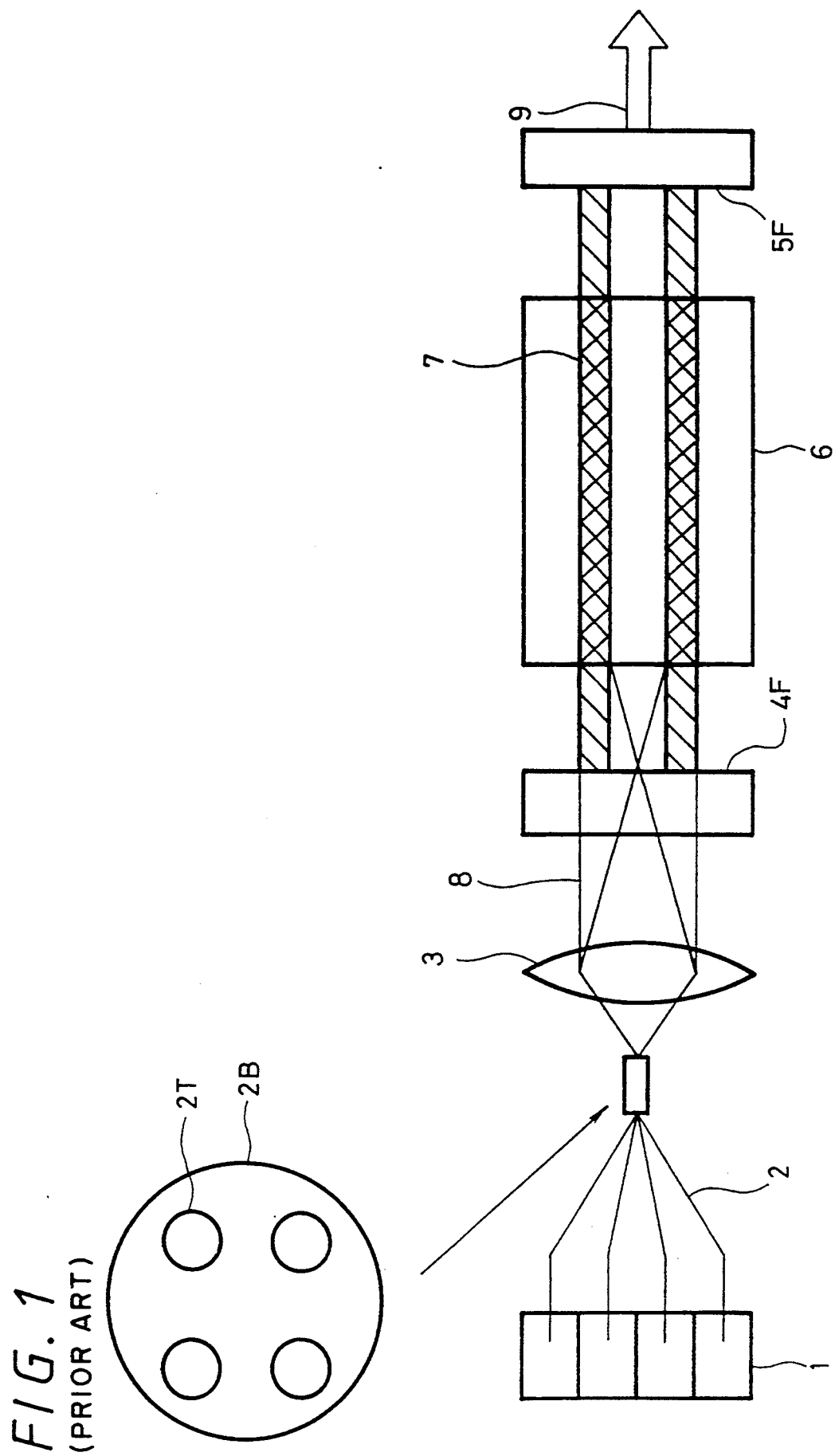
FIG. 1 shows an arrangement diagram of a conventional solid-state laser resonator.
Figure 5:
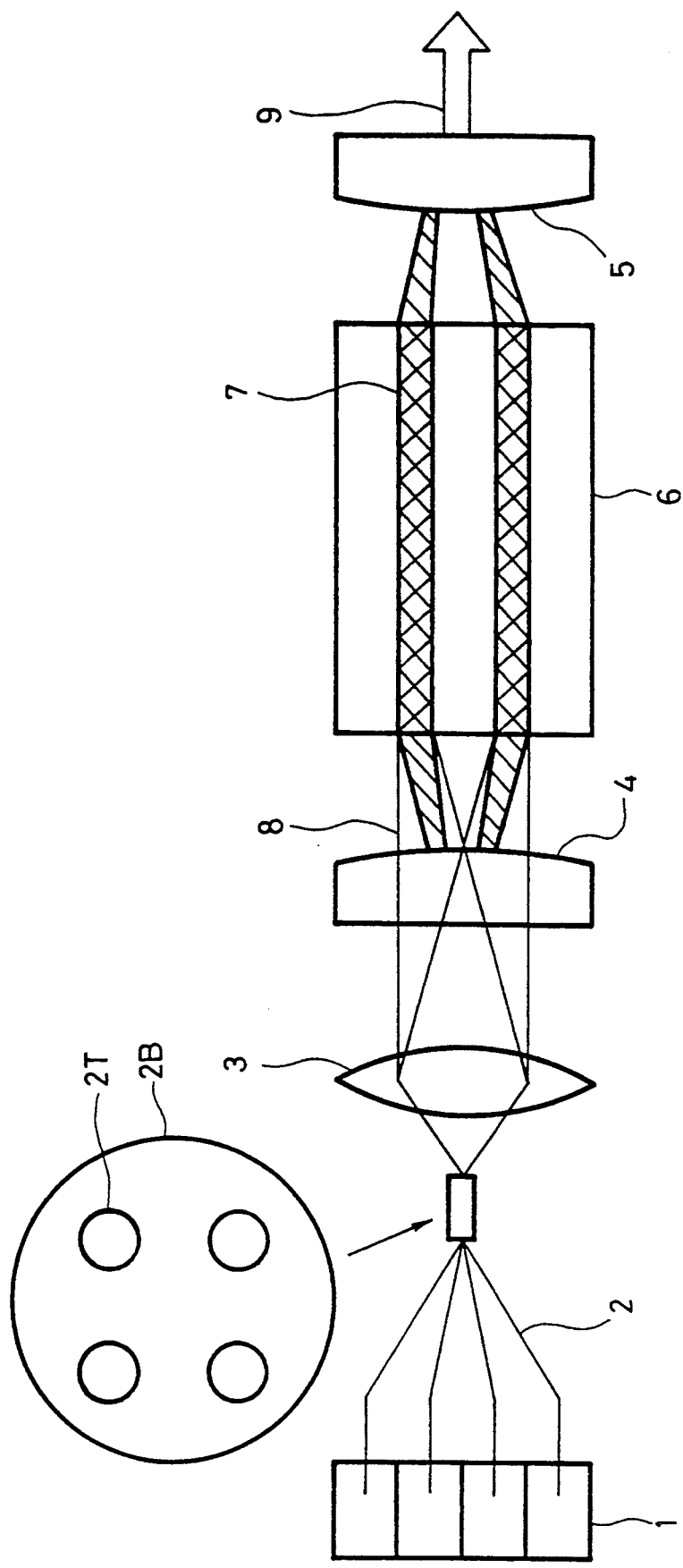
FIG. 5 shows an arrangement diagram of a first embodiment of the invention.

A first embodiment of the invention will be described in detail with reference to FIG. 5. In FIG. 5, like elements corresponding to those in FIG. 1 are identified by the same reference numerals and will not be described. The solid-state laser resonator of this embodiment has a pair of reflectors 4, 5, and the bar-like laser medium 6 interposed between the paired reflectors 4,5. The four laser beams 8 from four point laser source 1, 2 are passed through the reflector 4 and irradiated as pumping lights 8 on one end face of the laser medium 6, this causes an output laser beam to be produced from the other end face of the laser medium 6 through the reflector 5. A plurality of, for example, four, resonator portions are formed of a plurality of thermal lenses formed within the laser medium 6, the laser medium and the paired reflectors 4, 5. Each of the paired reflectors 4, 5 is convex. The other portions are constructed in the same way as in the resonator shown in FIG. 1.

Figure 2:
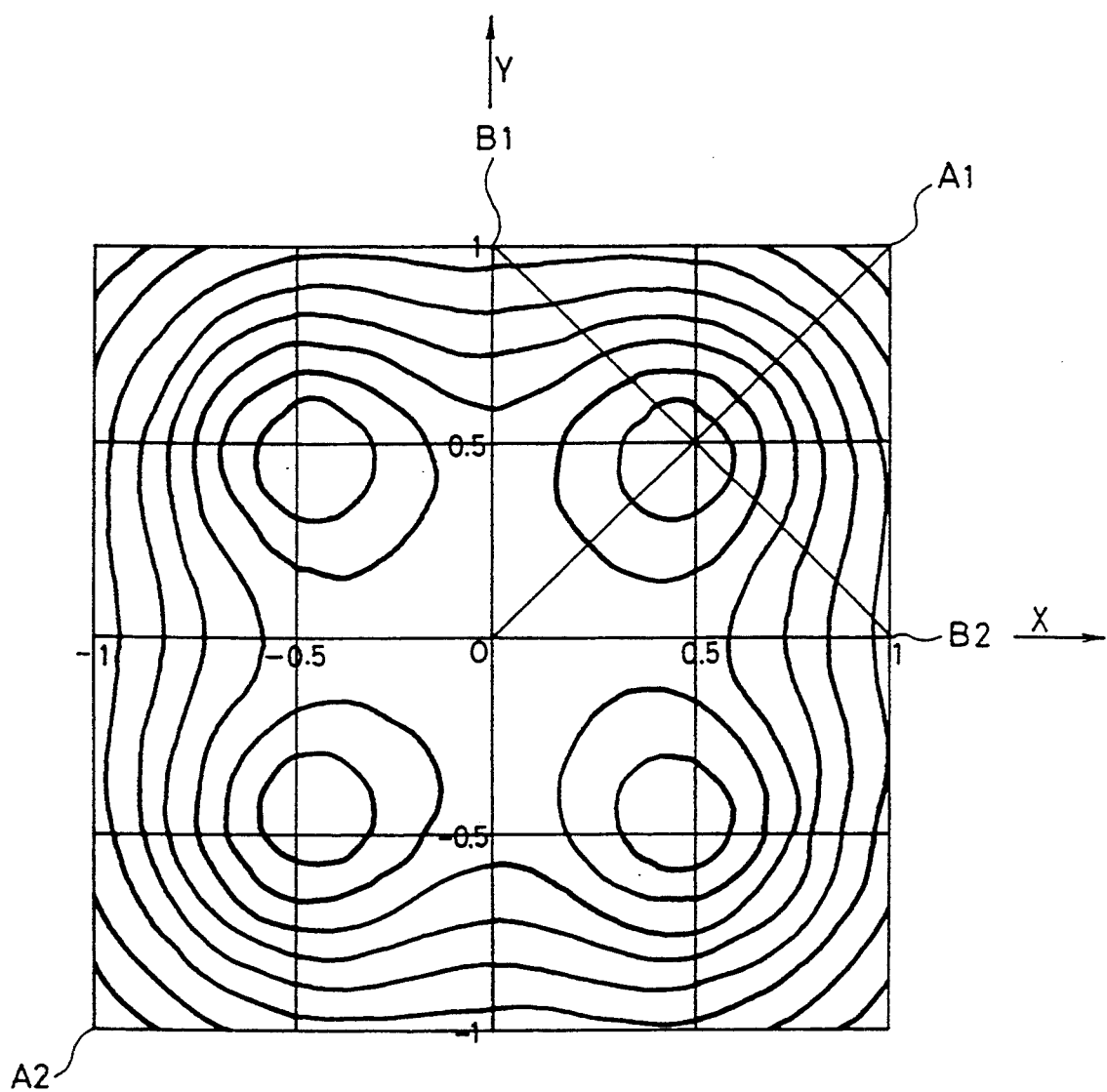
FIG. 2 shows the temperature distribution (refractive index distribution) within the laser medium.
Figure 3:
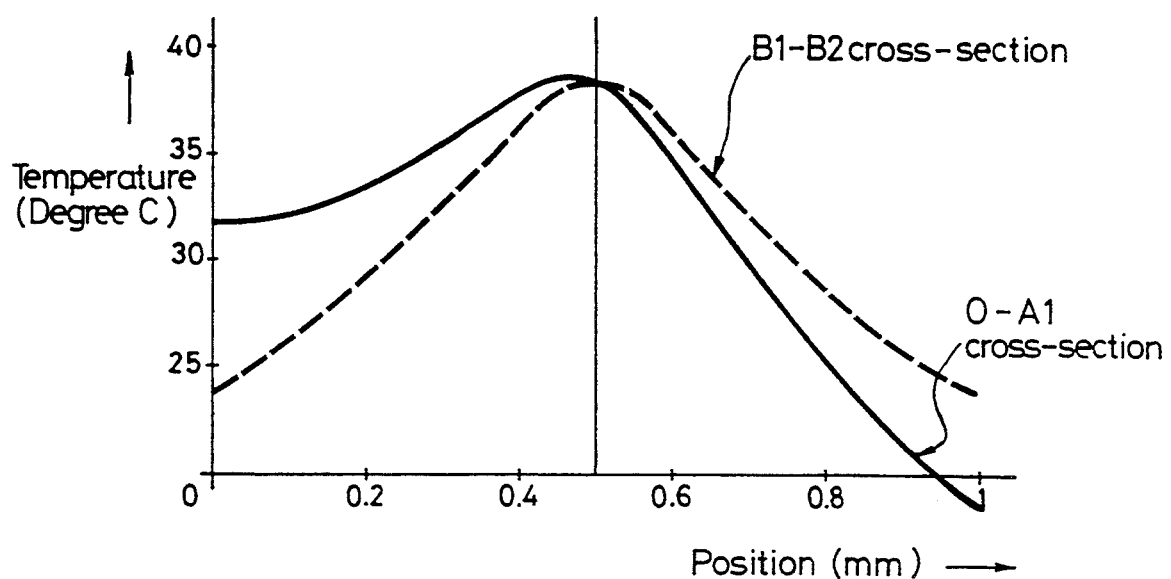
FIG. 3 shows the temperature distribution (refractive index distribution) within the laser medium.

The mechanism of the solid-state laser resonator of this first embodiment will be described with reference to FIGS. 2 and 4A-4C. The temperature distribution(-refractive index distribution) on the cross-section A1-A2 as shown in the diagram of FIG. 2 showing the temperature distribution(refractive index distribution) of the laser medium has a double-humped characteristic which is symmetrical with respect to a vertical line at the origin O as shown in FIG. 4(A).

Figure 4A:
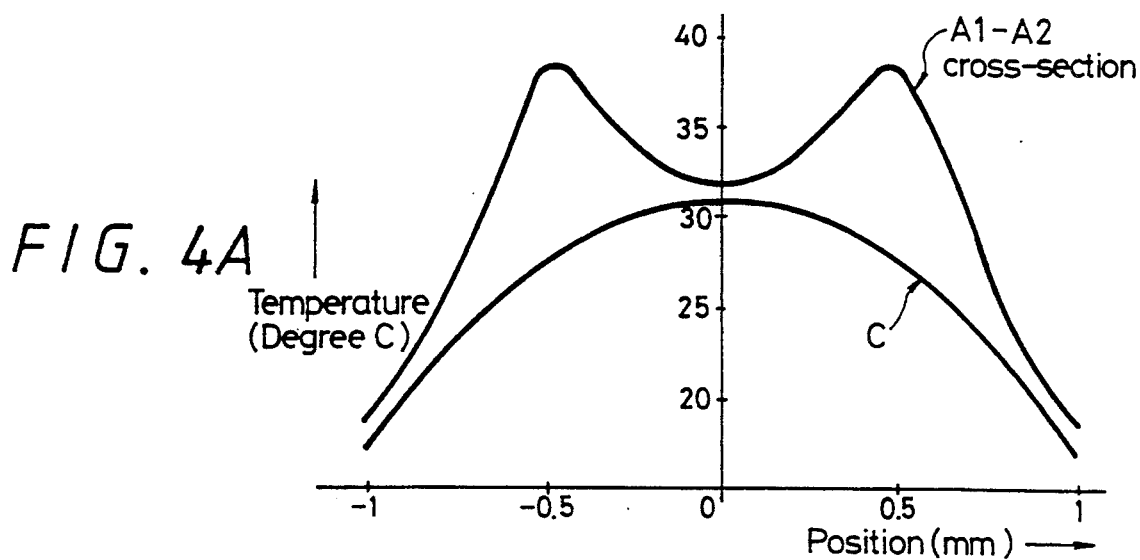
FIGS. 4A-4C show the curves and a schematic picture to which reference is made in explaining the thermal lens.
Figure 4B:
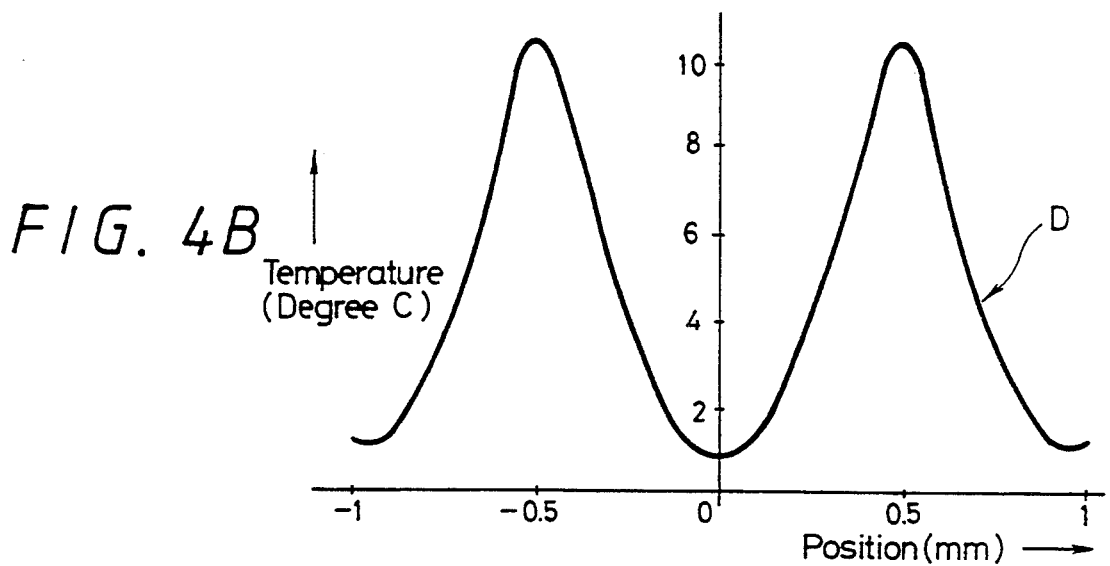
Figure 4C:
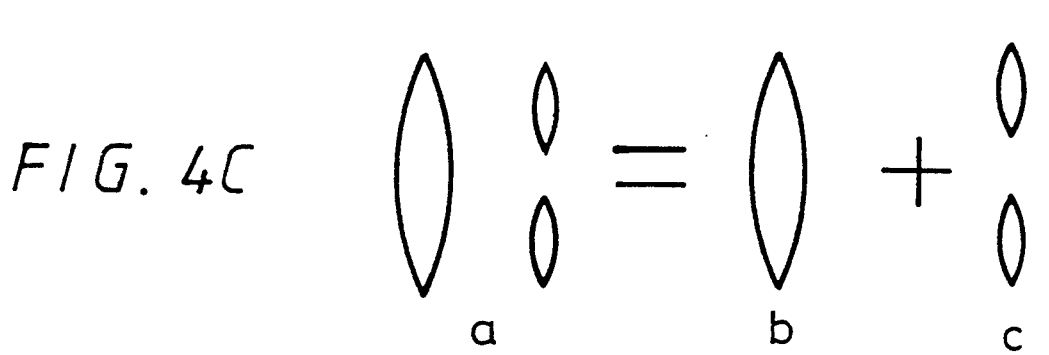

The refractive index distribution on the cross-section A1-A2 is shown in FIG. 4(B). The curve C shows the refractive index distribution of the convex lens of which the optical axis coincides with the axis of the laser medium 6 as indicated in FIG. 4(C). The curve D shows the refractive index of the four convex lenses of which the optical axes pass through the four coordinates of $X = \pm 0.5$ mm, $Y = \pm 0.5$ mm in FIG. 4(C). On the contrary, the refractive index distribution on the A1-A2 cross-section shown in FIG. 4(A) can be the refractive index distribution of a resultant indicated, at $\underline{a}$ in FIG. 4(C), of the four lenses indicated at $\underline{b}$ and $\underline{c}$.

If the refractive index distribution shown by the curve C in FIG. 4(A) is cancelled out by the convex mirrors 4, 5 so that a substantially constant refractive index distribution can be obtained, the refractive index distribution of the four thermal lenses can be shown by only the curve D in FIG. 4(B). The distribution of the refractive index such as focal distance of the convex mirrors 4, 5 is selected considering the characteristic of the refractive index distribution C shown in FIG. 4(A). The refractive index on the cross-section A1-O in FIG. 2 and the refractive index on the cross-section B1-B2 are both symmetric with respect to a straight line, and have substantially the same characteristic. As the result, the thermal lenses formed in the laser medium 6 to which the four laser beams 4 are incident have such a refractive index distribution that the isorefractive-index lines become substantially concentric around the incident point of each laser beam 8. Thus, since the four excited regions 7 coincide with the oscillation regions, respectively, the oscillation efficiency can be improved, and the output laser beam has reduced distortion in the wave and the aberration of the laser beam is decreased.

In the first embodiment, one of the paired reflectors 4, 5 may be a convex mirror and the other one may be flat mirror.

Figure 6:
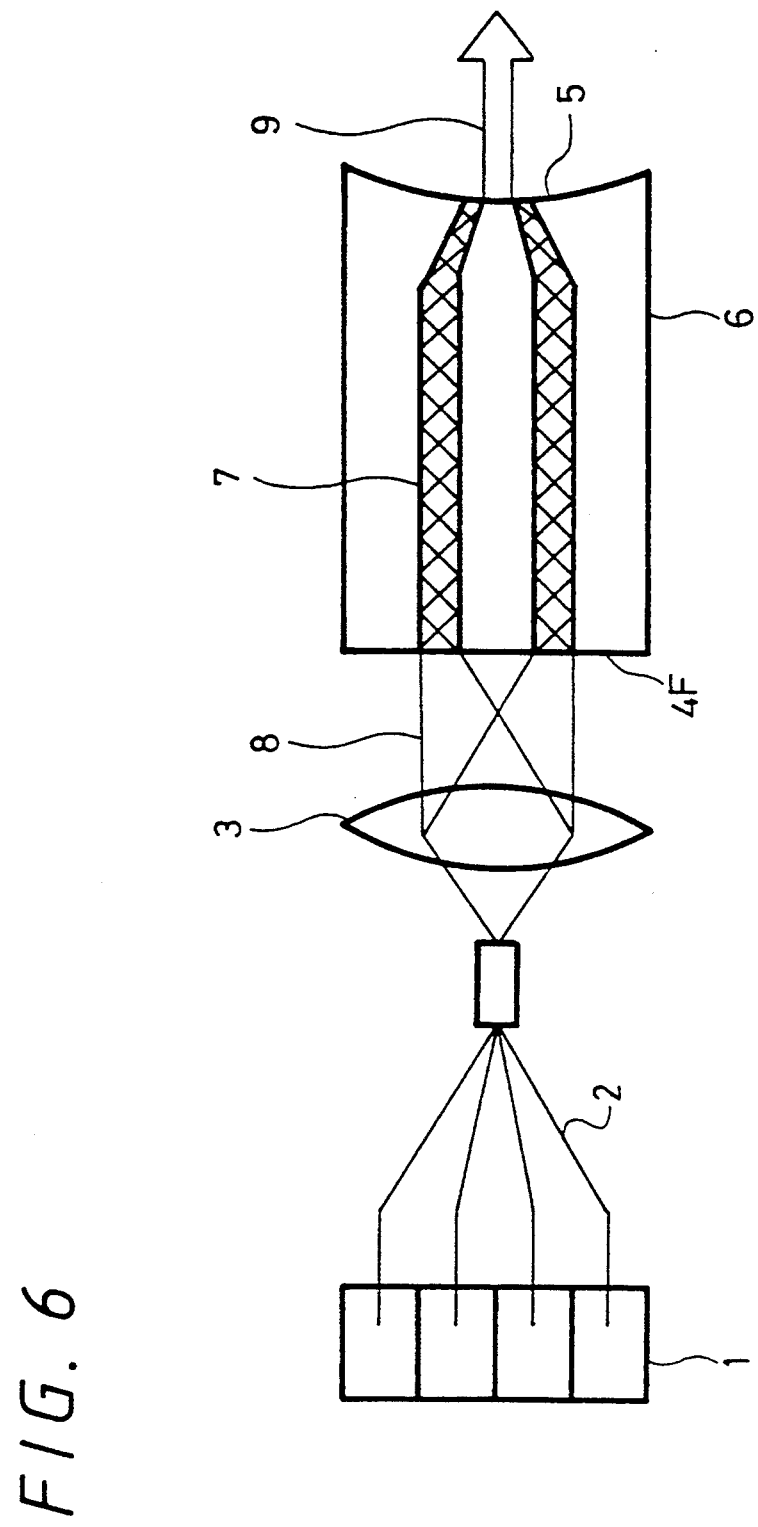
FIG. 6 shows an arrangement diagram of a second embodiment of the invention.

FIG. 6 shows a second embodiment of the solid-state laser resonator according to the present invention. In FIG. 6, like elements corresponding to those in FIGS. 1 or 5 are identified by the same reference numerals and will not be described. As shown in FIG. 6, the paired reflectors 4, 5 are not separately provided from the laser medium 6. Instead, they are formed by depositing a mirror coating on both end faces of the laser medium 6. In this second embodiment, the flat mirror 4F is formed on the end face of the laser medium 6 on the coupling-lens 3 side, and the convex mirror 5 on the opposite end face. These may be formed in the reverse manner. In addition, a convex mirror may be formed on the end faces of the laser medium 6. In that case, the laser medium is formed with a curved surface. The reflecting layer is coated on the curved surface.

In the first and the second embodiments the coupling lens 3 may be also omitted. Moreover, in place of the four optical fibers 2, four sets of a plurality of optical fibers each may be provided so that each of the four pumping light beams incident to the end face of the laser medium 6 is formed of a plurality of laser beams.

What is claimed is:

1. A solid-state laser resonator comprising:
   a pair of reflecting means, at least one of said reflecting means having a convex curved-surface mirror;
   a laser medium interposed between said pair of reflecting means and having end faces.;
   a plurality of point laser sources, laser beams emitted from said laser sources being passed through one of said paired reflecting means and irradiated as pumping lights on one end face of said laser medium; and
   means having a plurality of resonator portions, said resonator portions being comprised of said reflecting means, said laser medium and a plurality of thermal lenses which are formed within said laser medium, said means causing an output laser beam to be produced from the other end face of said laser medium through the other one of said reflecting means.

2. A solid-state laser resonator according to claim 1, wherein at least one of said paired reflecting means is formed on one end face of said laser medium.

3. A solid-state laser resonator according to claim 1, wherein the distance between said laser beams incident on one end face of the laser medium is selected to prevent the thermal lenses from optically interfering with each other by causing the relative spacings between the pumping lights on the one end face to have predetermined values.

4. A solid-state laser resonator according to claim 3, wherein the curvature of the convex, curved surface mirror is selected to cause the thermal lenses formed in the laser medium to have a refractive index distribution in which isorefractive-index lines become substantially concentric around a different incident points of each pumping laser light.

5. A solid-state laser resonator according to claim 1, wherein each of said first reflector and said second reflector have a convex, curved-surface mirror.

6. A solid-state laser resonator comprising:
   a first reflector;
   a second reflector;
   at least one of said first and second reflectors having a convex, curved mirror surface;
   a laser medium, having a first end face and a second end face, said laser medium being interposed between said first and second reflectors;
   a plurality of laser sources for emitting laser beams directed through said first reflector to said laser medium, to produce a pumping lights on said first end face; and
   a plurality of thermal lenses formed within said laser medium and resonant with said first and second reflectors and said laser medium to cause a laser beam to be emitted at said second end face through said second reflector, wherein the distance between said laser beams incident on said first end face is selected to prevent the thermal lenses from optically interfering with each other by causing the relative spacings between the pumping lights on said first end face to have predetermined values.

7. A solid-state laser resonator according to claim 6, wherein the curvature of the convex, curved mirror surface is selected to cause the thermal lenses formed in the laser medium to have a refractive index distribution in which isorefractive-index lines become substantially concentric around a different incident points of each pumping laser light.

8. A solid-state laser resonator comprising:
   a first reflector;
   a second reflector;
   a laser medium, having a first end face and a second end face, said laser medium being interposed between said first and second reflectors;
   a plurality of laser sources for emitting laser beams directed through said first reflector to said laser medium, to produce a pumping lights on said first end face; and
   a plurality of thermal lenses formed within said laser medium and resonant with said first and second reflectors and said laser medium to cause a laser beam to be emitted at said second end face through said second reflector, wherein each of said first reflector and said second reflector have a convex, curved-surface mirror.

* * * * *